United States Patent [19]
Jehu

[11] 3,728,975
[45] Apr. 24, 1973

[54] METHOD AND APPARATUS FOR TRANSPORTATION OF READILY DAMAGED ARTICLES

[75] Inventor: Richard Walker Jehu, Sciotoville, Ohio

[73] Assignee: The Dow Chemical Company, Midland, Mich.

[22] Filed: Apr. 28, 1971

[21] Appl. No.: 138,089

[52] U.S. Cl. .........105/369 BA, 105/367, 105/369 S, 105/376
[51] Int. Cl. ...........................B60p 7/16, B61d 45/00
[58] Field of Search ..................105/355, 366 R, 367, 105/392.5, 370, 371, 373, 378, 369 B, 369 BA, 369 S, 369 U, 423, 369, 376; 296/41

[56] References Cited

UNITED STATES PATENTS

| | | | |
|---|---|---|---|
| 3,079,874 | 3/1963 | Hansen et al. | 105/369 BA |
| 2,819,810 | 1/1958 | DeWitt | 105/369 BA |
| 3,067,699 | 12/1962 | Fredriks | 105/369 BA |
| 1,642,562 | 9/1927 | Scohy | 105/367 |
| 3,427,995 | 2/1969 | Stafford, Jr. | 105/369 BA |
| 3,354,839 | 11/1967 | Lich et al. | 105/367 |
| 1,583,874 | 5/1926 | Fricke | 105/378 |
| 3,115,977 | 12/1963 | Mirando | 105/369 BA |
| 3,260,223 | 7/1966 | Black et al. | 105/366 R |

Primary Examiner—Drayton E. Hoffman
Attorney—Griswold & Burdick, Richard G. Waterman and Robert B. Ingraham

[57] ABSTRACT

Readily damaged articles are shipped and transported by confining the articles in generally parallel, regular arrangement, applying a compressive force in a direction normal to the force of gravity and restricting motion in a direction generally normal to a plane containing the force of gravity and the compressive force. The method and apparatus of the present invention are particularly suited for the shipment of plastic foam bodies and rectangular containers having low compressive strength.

2 Claims, 4 Drawing Figures

PATENTED APR 24 1973                    3,728,975
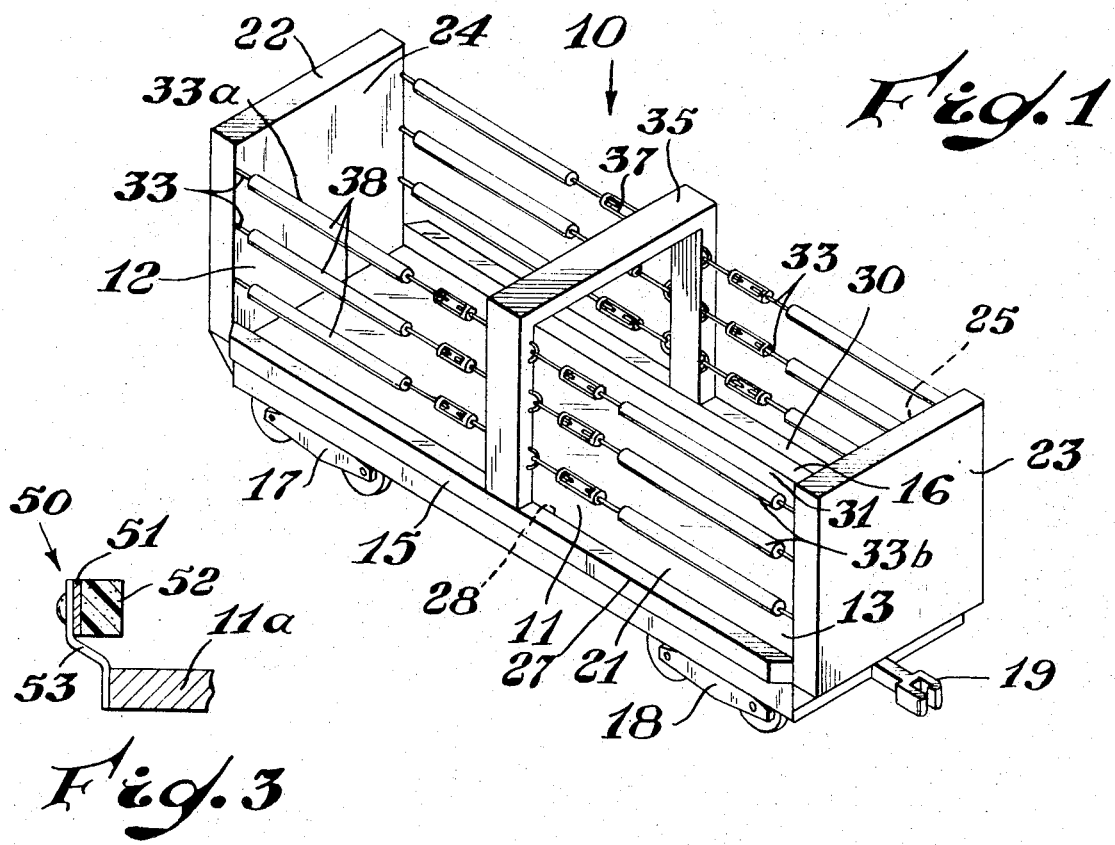
Fig.1
Fig.3
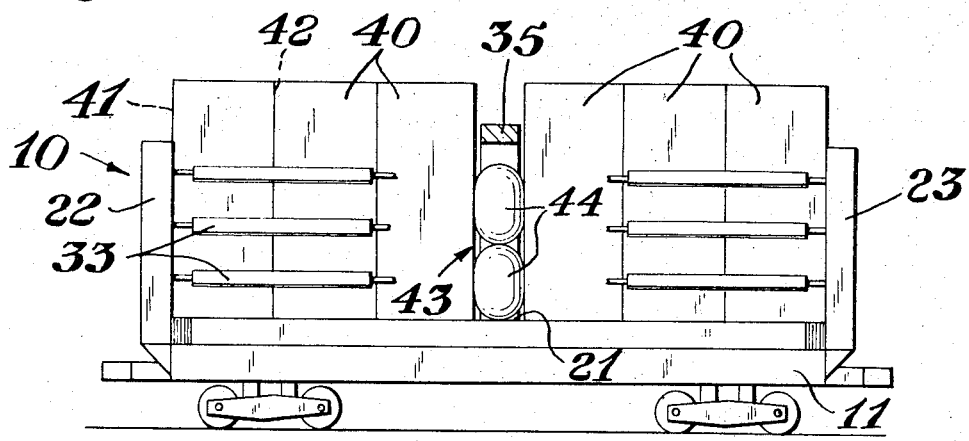
Fig.2
Fig.4
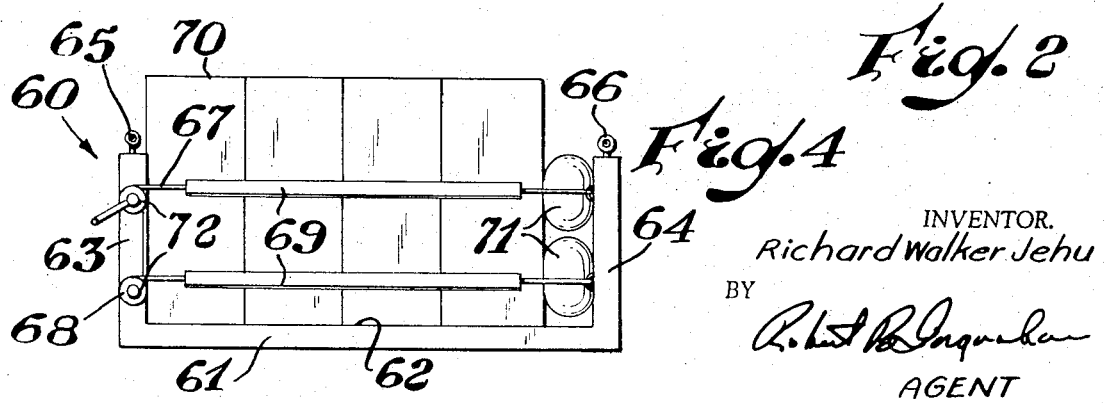
INVENTOR.
Richard Walker Jehu
BY
Robert R. Ingraham
AGENT

METHOD AND APPARATUS FOR TRANSPORTATION OF READILY DAMAGED ARTICLES

Bodies of relatively low density are subject to mechanical damage while handling and generally are shipped only with difficulty. For example: plastic foam bodies such as billets, packages of foam plastic plank and paperboard cartons of large size; that is, having at least two edge dimensions exceeding about 18 inches and 60 inches, generally are transported in an enclosed van or car wherein they must be placed with substantial care to prevent damage by abrasion or impact against other materials. Further, dunnage of one variety or another must be positioned to prevent undesired motion in transit and reduce the possibility of scuffing or abraiding of the materials being shipped. Oftentimes low bulk density materials such as plastic foams having densities in the range of from about 2 to 10 pounds per cubic foot are desired in relatively large billets such as billets of 50 × 27 × 144 inches. Such foam plastic billets are often subject to damage by abrasion, impact or application of localized pressure such as by contact with sharp corners, restraining cables or chains or the like. Generally, such billets in quantity are transported in a railroad boxcar where they are individually passed through the door and positioned generally lengthwise for transport, and suitable dunnage material provided. Such billets are generally loaded with difficulty and a substantial amount of time is required for both loading and unloading. Somewhat similar difficulties, but to a reduced degree, are encountered in truck transport or in piggy-back handling of such shipments. Other lightweight, low density materials which offer similar problems in transportation are large paper cartons; for example, generally cubic containers measuring from 36 to 48 inches on an edge and containing lightweight materials such as expanded mica; e.g., vermiculite, shredded plastic foam, plastic foam dunnage and the like. Oftentimes in order to avoid the problems caused by shipping such materials in a closed cargo container, such as a boxcar or enclosed truck body, materials have been stacked in a number of parallel layers in the manner of lumber and suitable retaining members such as steel straps, chains or the like passed over the elongate members to maintain them in a desired position. Much labor and effort are required to provide suitable padding materials to prevent damage of the low density articles by the restraining straps, cables or chains. Generally, any corners must be protected by means of wooden or metal angles which oftentimes are positioned only with great difficulty.

It would be desirable if there were available an improved method and means for the transport of readily damaged materials.

It would also be desirable if there were available an improved method and apparatus for the transportation of plastic foam billets.

It would further be desirable if such method and apparatus would provide substantial savings in both labor and transporting apparatus.

These benefits and other advantages in accordance with the present invention are achieved in a method for the loading of a vehicle with a plurality of readily damageable members, the members having at least two generally parallel sides, the vehicle having a floor, positioning the articles in such a manner that the generally parallel sides extend in a direction generally normal to and above the floor, resiliently tensioning the articles in a direction generally normal to generally parallel sides, restraining motion of the articles from moving beyond the limits of the vehicle floor.

Also contemplated within the scope of the present invention is an elongate vehicle, the elongate vehicle having a floor, a longitudinal direction and a transverse direction, a first end and a second end, a first restraining means disposed at the first end and extending upwardly from the vehicle floor, a second restraining means disposed at the second end and upwardly extending from the vehicle floor, first and second resilient side restraining means disposed in facing relationship over at least a major portion of the first and second edges of the floor, and at least one elongate cushioned restraining member extending from the first restraining means to the second restraining means.

Further features and advantages of the present invention will become more apparent from the following specification taken in connection with the drawing wherein:

FIG. 1 is a schematic representation of a vehicle in accordance with the present invention.

FIG. 2 is a schematic partially in-section view of the vehicle of FIG. 1 carrying a fragile load.

FIG. 3 is a schematic representative of a cross-sectional view of the side restraining means of the vehicle of FIG. 1.

FIG. 4 is an alternate embodiment of the invention.

In FIG. 1 there is schematically depicted a vehicle, such as a railroad flatcar, in accordance with the present invention generally designated by the reference numeral 10. The vehicle 10 comprises in cooperative combination a floor or bed 11 having a first end 12 and a second end 13, a first side 15 and a second side 16. The floor 11 is supported by a first set of wheels 17 at the first end and a second set of wheels 18 at the second end. A coupling means 19 is disposed at the second end and a similar coupling means, not shown, is affixed to the first end. The floor 11 has an upper or material supporting surface 21. A first restraining means or bulkhead 22 is disposed adjacent the first end 12 and extends upwardly and generally normal to the surface 21. A second restraining means or bulkhead 23 is affixed to the second end 13 and extends generally normal to the surface 21 and in opposed facing relationship to the first restraining means 22. The restraining means 22 and 23 have generally opposed and parallel surfaces 24 and 25, respectively. A first edge restraining means 27 is disposed generally parallel to the first edge 15 of the bed 11 and has an inwardly facing resilient surface 28 which is positioned above the surface 21 and is directed to the second side 16. A similar restraining means 30 is disposed along the second edge 16. The restraining means 30 has an inwardly facing resilient surface 31 facing the resilient surface 28 of the first restraining means 27. A plurality of flexible elongate side restraining means 33 extend generally from the first end restraining means 22 to the second end restraining means 23. The restraining means 33 are generally spaced vertically from the edge restraining means 28 and 30. Each of the restraining means 33 comprises a first portion 33a and a second portion 33b. A frame 35 is disposed generally midway between the ends 12 and 13 of the bed 21 and extends upwardly and from the first edge 15 to the second edge 16. The restraining means portions 33a and 33b are each connected to the frame 35 by tensioning means 37 such as a load binder, turnbuckle or the like. Each of the restraining means members 33 has disposed thereon an elongate jacket or padding 38.

FIG. 2 is a partially in-section view of the flatcar 10 of FIG. 1 wherein a plurality of elongate fragile objects 40, such as foam plastic billets, are disposed on the surface 21. The objects 40 each have a first surface 41 and a second surface 42 extending generally parallel to each other. The objects 40 are oriented in such a manner that the surfaces 41 and 42 are generally parallel to the restraining means 22 and 23; that is, extending normally from the surface 21. The objects 40 are divided into two groups by the frame 35 and the two groups are separated thereby. A resilient tensioning means 43 is disposed between the two groups and beneath the frame 35. The resilient tensioning means 43 is air dunnage bags 44. The air dunnage bags are flexible-walled, generally gas-impervious containers inflated with a compressible fluid such as air, to provide a desired force on the elongate objects and maintain them in relatively fixed relationship to the end restraining means or bulkheads 22 and 23.

FIG. 3 depicts a cross-sectional view of a side restraining means or rail generally designated by the reference numeral 50. The rail 50 comprises an elongate rigid member 51 and a flexible or resilient padding member 52 which beneficially may be of plastic foam, foam rubber or fibrous padding. The restraining means 51 is affixed to a floor or bed 11a by means of a plurality of longitudinally spaced brackets 53.

In operation of the embodiment of the invention as depicted in FIGS. 1 and 2, the side restraining means 33a and 33b are detached from the frame 35 on one side of the vehicle. Elongate objects such as foam plastic billets or the like are stacked essentially on end in such a manner that each billet has at least two faces parallel to the end restraining means or bulkheads 22 and 23. Pneumatic dunnage bags are then placed between the two groups of billets and beneficially under the frame 35 and the bags inflated to provide a force on the billets somewhat less than the force required to cause significant permanent deformation thereto. The frame 35 provides substantial protection for the bags from vandalism. The billets, such as the articles 40, are relatively tightly wedged between the bulkheads 22 and 23. The side restraining members 33a and 33b are then re-positioned and tightened. The resultant assembly is relatively resistant to shock and vibration. End to end movement is prevented by the resilient force applied by the pneumatic dunnage bags, while a lateral movement is resisted by the frictional force between the adjacent articles. If, due to vibration or impact, some lateral motion of the articles occurs, the articles can move only as far as the edge restraining means 27 and 30. The side restraining portions 33a and 33b prevent any significant lateral outward tilting of the load and the padding 38 of the restraining means 33 and the edge restraining means 27 and 30 prevent significant motion-induced scuffing of the articles being transported.

An alternate embodiment of the invention is depicted in FIG. 4 generally designated by the reference numeral 60. The vehicle 60 comprises a generally planar base member, pallet or bed 61 having a load carrying surface 62. The bed 61 has first and second end or terminal restraining means or bulkheads 63 and 64, respectively, disposed at opposite ends thereof. Each of the bulkheads 63 and 64 have connecting means 65 and 66, respectively, adapted to engage a sling or other hoisting means. Side restraining means 67 and 68 extend between the bulkheads 63 and 64. Each of the restraining means 67 and 68 have padding means 69. Similar restraining means are oppositely disposed and are not shown. A plurality of articles such as elongate paperboard cartons 70 are disposed on the surface 62 between the bulkheads 63 and 64. Air dunnage bags 71 provide tensioning means to maintain the articles 70 in their desired position. The bulkhead 63 carries winches 72 operatively connected to the side restraining means 67 and 68, which beneficially are padded cables, and provide a means of tensioning the restraining means 67 and 68. Similar winches are provided on the opposite side.

The embodiment of FIG. 4 is particularly suited for the transport of such articles wherein unitized containers are desired for rail, sea or air shipment.

Apparatus generally as depicted in FIGS. 1, 2 and 3 is eminently satisfactory for the transportation of rigid foam plastic such as polystyrene and rigid polyurethane foams. Substantial economics are effected and savings in time and labor in loading and unloading in a variety of weather conditions, including rain, snow, sleet and sunshine. Such products appear to suffer no ill effects during normal periods of time in transit. In transporting paperboard containers or other materials which are moisture sensitive, a thin plastic film draped thereover generally will provide adequate weather protection.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A railroad flatcar having
   a floor,
   a longitudinal direction and
   a transverse direction,
   a first end and
   a second end,
   a first restraining means disposed at the first end and extending upwardly from the floor,
   a second restraining means disposed at the second end and upwardly extending from the vehicle floor,
   first and
   second resilient side restraining means disposed in facing relationship over at least a major portion of the first and second edges of the floor, and
   at least one elongate cushion restraining member extending from the first restraining means to the second restraining means, a plurality of flexible elongate restraining means disposed generally parallel to the first and second side restraining means and vertically spaced thereabove, said flexible restraining means being detachably affixed, at least one pneumatic dunnage element disposed at a location generally adjacent the floor thereof and between the first and second restraining means, and a plurality of foamed plastic billets tightly wedged between the first and second restraining means by the pneumatic dunnage element.

2. The vehicle of claim 1 including a frame generally centrally disposed between the first and second restraining means, the frame generally upwardly extending from the first and second edges of the floor.

* * * * *